Jan. 11, 1955  G. MAIRE  2,699,034
STEERING WHEEL WOUND CLOCK FOR MOTOR VEHICLES
Filed July 26, 1951  3 Sheets-Sheet 1
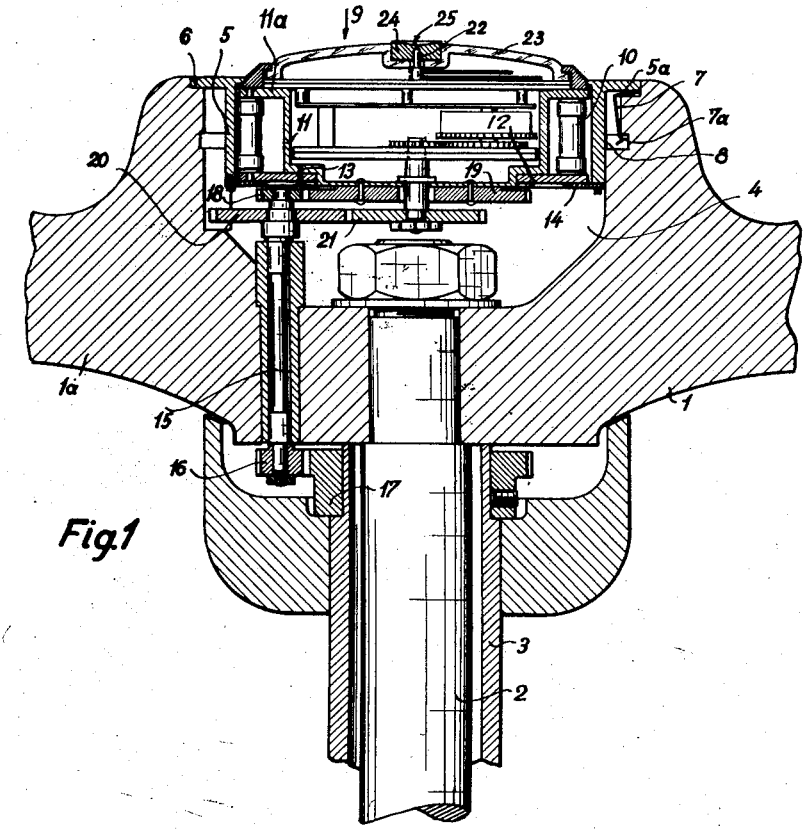
Fig.1
Fig.2
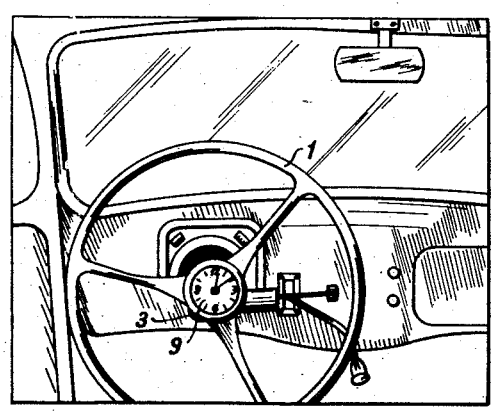
Inventor
Georges Maire
By Robert E Burns
Attorney Jan. 11, 1955  G. MAIRE  2,699,034
STEERING WHEEL WOUND CLOCK FOR MOTOR VEHICLES
Filed July 26, 1951  3 Sheets-Sheet 2

Inventor
Georges Maire
By Robert E. Burns
Attorney

Jan. 11, 1955   G. MAIRE   2,699,034
STEERING WHEEL WOUND CLOCK FOR MOTOR VEHICLES
Filed July 26, 1951   3 Sheets-Sheet 3

Inventor
Georges Maire
By Robert E. Burns
Attorney

United States Patent Office 2,699,034
Patented Jan. 11, 1955

2,699,034

STEERING WHEEL WOUND CLOCK FOR MOTOR VEHICLES

Georges Maire, Tavannes, Switzerland, assignor to Tavannes Watch Co. S. A., Tavannes, Switzerland, a firm of Switzerland Application July 26, 1951, Serial No. 238,645

Claims priority, application Switzerland May 2, 1951

9 Claims. (Cl. 58—46)

The present invention has for its object a steering wheel provided with a watch for motor cars and the like vehicles.

According to a primary object of my invention, the watch is revolubly carried with reference to the axis of the steering wheel while the steering wheel itself carries eccentrically with reference to its axis a spindle that is rotatable with reference to the steering wheel round an axis parallel with the axis of said steering wheel and said spindle carries two pinions of which one secured at the lower end of the spindle meshes with a stationary toothed wheel rigid with the stationary tubular support of the steering column while the second pinion engages a toothed wheel carried by the watch casing coaxially with the latter so as to constrain the watch to remain stationary when the steering wheel is being angularly shifted, automatic winding up means being provided so as to wind up the watch through the successive rotations of the steering wheel.

Annexed drawings illustrate, by way of example, various embodiments of the invention.

In said drawings:

Fig. 1 is an axial cross-section through a portion of the steering wheel.

Fig. 2 is a view of the steering wheel showing also a portion of the dashboard and of the windshield.

Figure 3:
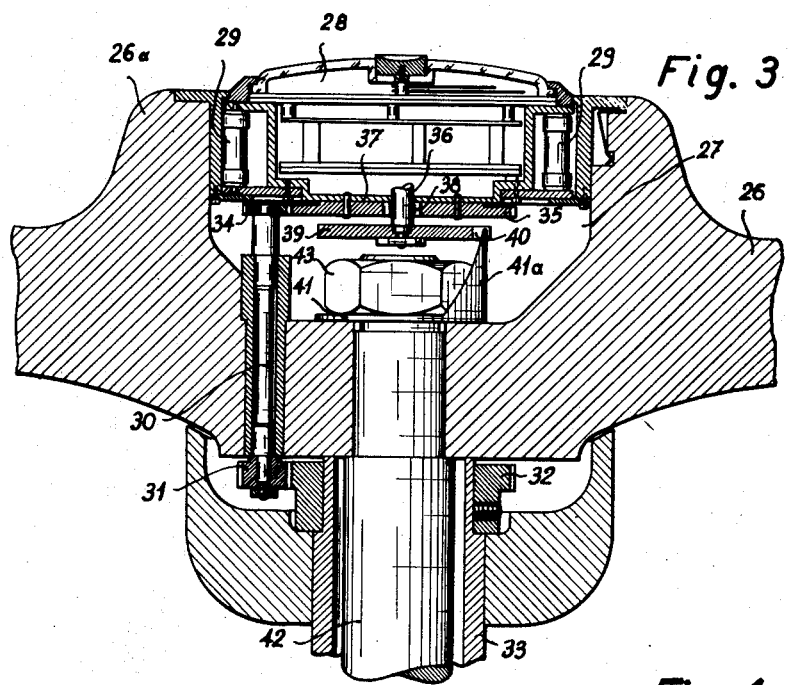
Figs. 3 to 6 are axial cross-sections through four other embodiments of the invention.

The steering wheel is shown at 1 in Figs. 1 and 2 while the steering column carrying it is shown at 2. This column is rotatably carried in the standard stationary tubular support 3 and the hub 1a of the steering wheel is provided at 4 with a recess housing a hollow cylindrical frame 5 having an outer flange 5a fitted in a groove 6 at the upper surface of the hub. The flange 5a carries, at 120° from one another, three blade springs 7, the bent ends 7a of which engage an annular groove 8 provided in the side wall of the recess 4. These springs hold the cylindrical frame 5 in position. A watch 9 is rotatably carried by said cylindrical frame by means of three rollers 10 located at 120° with reference to one another and adapted to pivot round their axes, that are parallel with the axis of the steering wheel, between the flange 11a on the casing 11 of the watch and the plate 12 secured through screws 13 to the bottom of said casing. The cylindrical or tubular frame 5 is provided with a bottom 14 carrying the said plate 12 for holding the watch 9 in position. In the mounting, the watch is first positioned inside the frame and the latter is then fitted at the center of the steering wheel. The hub 1a of the steering wheel carries towards its periphery a spindle 15 parallel with the axis of the steering wheel and rotatably mounted in said hub. Said spindle is rigid coaxially with three pinions of which one, 16, that is carried by the lower end of the spindle, meshes with a stationary wheel 17 fitted over the tubular support 3 for the steering column 2. The second pinion shown at 18 at the upper end of the spindle 15 meshes with a wheel 19 coaxial with the watch 9 and riveted to the bottom 11 of the latter. The pinions 16 and 18 on one hand and the wheels 17 and 19 on the other have respectively the same number of teeth. Consequently, when the steering wheel is shifted angularly in a turn, the watch remains stationary by reason of the wheel 17 being stationary and constraining the wheel 18 to remain in the same angular position. A third pinion on the spindle 15 is shown at 20 a little underneath the pinion 18; it meshes with a wheel 21 forming part of the clockwork winding up means and that is carried coaxially with the latter. The number of teeth on the pinion 20 differs from that on the pinions 16 and 18 whereby the wheel 21 is angularly shifted through the turning of the steering wheel in order to provide for the winding up of the watch.

The spindle 22 carrying the minute hand passes through the glass 23 and carries at its upper end a knob 24 housed in a recess of the glass and that serves for setting the time right. The upper concave surface 25 of said knob is knurled so that the knob may be actuated by only one finger.

In a modification, the wheels 17 and 19 may be replaced by wheels with an inner series of teeth located on the outside of the pinions 16 and 18 with which they are to mesh.

Turning to the embodiment of Fig. 3, the steering wheel is shown at 26 and its hub at 26a. A recess 27 is provided at the center of said hub and a watch 28 is rotatably carried in said recess coaxially with the steering wheel through the agency of three rollers 29 arranged at 120° with reference to one another. The hub 26a carries eccentrically and in parallelism with its axis a rotary spindle 30 the lower end of which carries a pinion 31 meshing with a stationary wheel 32 secured to the standard tubular support 33. The spindle 30 carries at its upper end a pinion 34 the number of teeth of which is the same as that of the pinion 31 and which meshes with a wheel 35 secured to the watch 28 and the number of teeth of which is equal to that of the teeth on the wheel 32. Under such conditions, the wheel 32 being stationary, the wheel 35 and consequently the watch 28 remains stationary whatever may be the angular movements of the steering wheel.

The winding up gearing for the watch that is not illustrated is controlled by a spindle 36 coaxial with the watch and passing through the bottom 37 of the latter and through the central opening 38 in the wheel 35 rigid with said bottom 37. The spindle 36 carries at its lower end a disc 39, a radial notch 40 of which is engaged by a projection 41a forming part of a washer 41 secured to the steering column shown at 42 through the nut 43 holding the steering wheel 26 fast on said column 42. Through this arrangement, the disc 39 and the spindle 36 revolve in unison with the steering column while the watch remains stationary, which produces the winding up of the watch.

Figure 4:
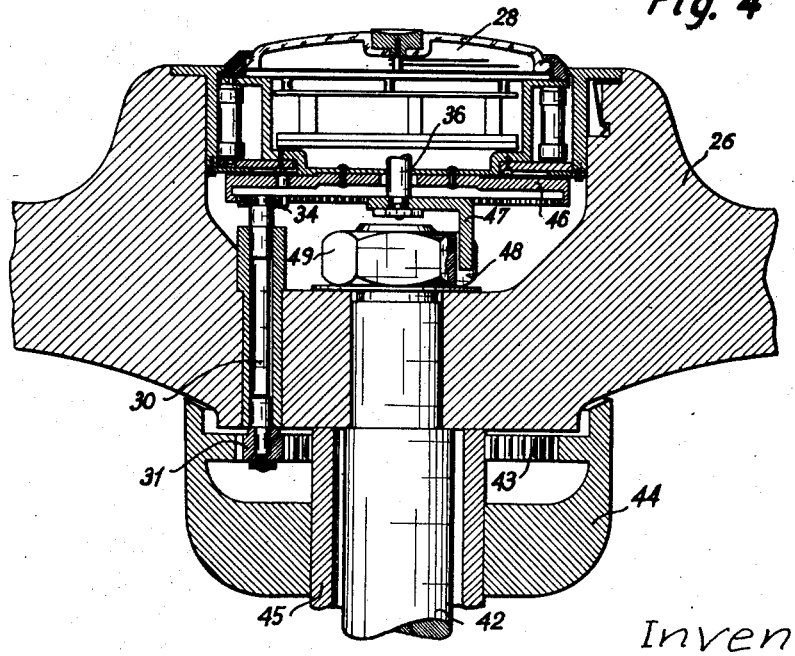

In the embodiment of Fig. 4, the pinion 31 that is secured to the inner end of the eccentric spindle 30 meshes with the inner teeth 43 provided on an annular member 44 rigid with the stationary steering tubular support 45. The pinion 34 that is carried as precedingly at the upper end of the spindle 30 also meshes with the teeth provided inwardly of a wheel 46 rigid with the watch 28. The winding up spindle 36 carries a downwardly bent lug or projection 47 the end of which engages a notch 48 in the nut 49 securing the steering wheel 26 to the steering column 42. This arrangement operates exactly in the same manner as the first embodiment and this is the case also of the embodiments of Figs. 5 and 6 to be now described.

Figure 5:
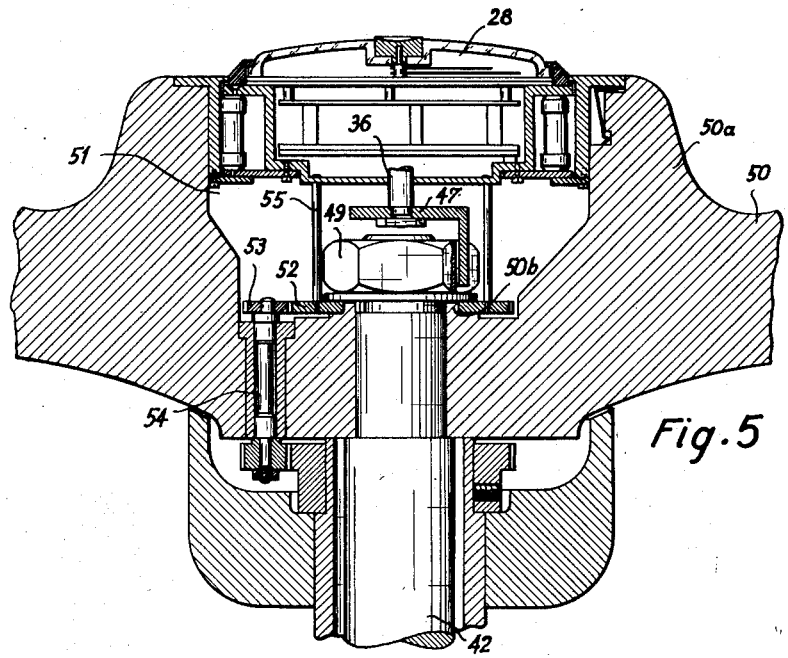

In Fig. 5, the steering wheel is shown at 50 and its hub at 50a. The bottom of the recess 51 in the hub carries an annular projection 50b on which is rotatably mounted a wheel 52 meshing with the pinion 53 secured to the upper end of the eccentric spindle 54 revolving in the hub 50a and extending in parallelism with the axis of the latter. The wheel 52 is rigid with the watch 28 as provided by the stays 55 parallel with the steering axis and distributed round the periphery of the nut 49 securing the wheel to the steering column 42. The spindle 36 is again connected with the shaft 42 through a bent lug or projection 47 similar to that described with reference to Fig. 4.

Figure 6:
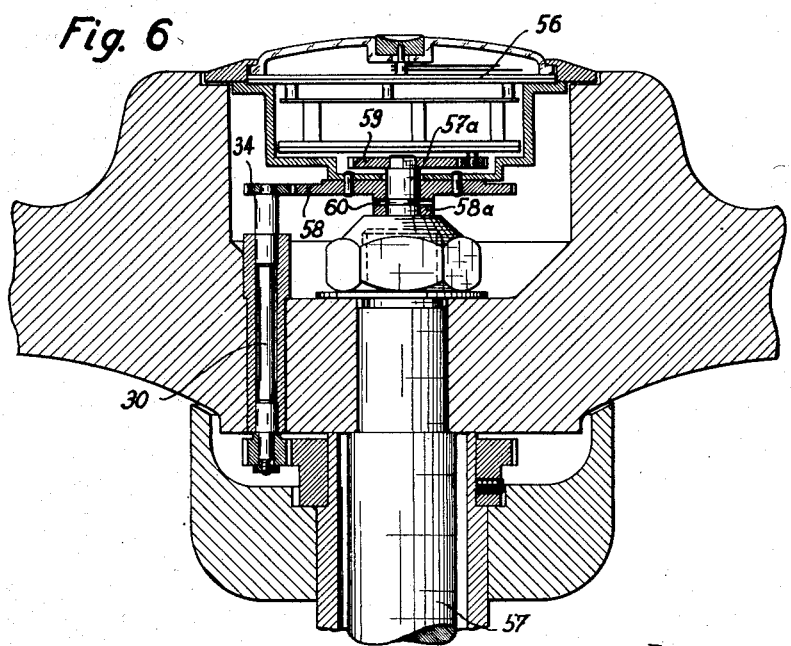

Lastly, in Fig. 6, the watch illustrated at 56 is rotatably carried by an extension 57a of the steering column 57 through the agency of the hub 58a of a wheel 58 secured to the watch, fitted over the column and meshing with the pinion 34 again carried at the upper end of the eccentric spindle 30. The extension 57a of the column 57 engages the inside of the watch and carries on a square-shaped section a wheel 59 forming part of the winding up gearing. The watch 56 is held fast in the desired position through the tong-shaped spring or tweezers 60.

What we claim is:

1. In a watch-carrying steering wheel for vehicles wherein the steering wheel is mounted at the extremity of a steering column rotating in a stationary tubular support, a watch coaxial with the axis of said steering wheel and mounted thereon, a spindle eccentric with reference to the axis of the steering wheel and rotatably mounted thereon around an axis parallel with the axis of the steering wheel, two pinions rigid with said spindle, a stationary first toothed wheel rigid with said stationary tubular support and meshing with one of said pinions, a second toothed wheel rigid with said watch coaxially with the latter and with the axis of the steering wheel and which is driven by the other of said pinions, the gearing-ratio between said first wheel and its pinion being the same as between said second wheel and its pinion, so as to constrain said watch to remain stationary when the steering wheel is being angularly shifted.

2. In a watch-carrying steering wheel as claimed in claim 1, the feature that the two pinions rigid with the eccentric spindle have the same number of teeth while the toothed wheel secured to the watch has the same number of teeth as the toothed wheel rigid with the stationary tubular support.

3. In a watch-carrying steering wheel as claimed in claim 1, comprising a watch-casing, a cylindrical frame wherein the watch-casing is carried, said frame being fitted in a groove provided coaxially with the steering wheel in the hub thereof, and rollers inserted between said cylindrical frame and said watch.

4. In a watch-carrying steering wheel, as claimed in claim 1, said steering wheel having a recess and an annular projection extending from the bottom of said recess, said second toothed wheel rigid with the watch being rotatably mounted on said projection, and an annular system of stays, parallel with the axis of the steering column and of the watch, connecting said second toothed wheel rigidly with the watch casing.

5. In a watch-carrying steering wheel for vehicles, wherein the watch comprises a winding-up gearing and wherein the steering wheel is mounted at the extremity of a steering column rotating in a stationary tubular support, a watch coaxial with the axis of said steering wheel and mounted thereon, a spindle eccentric with reference to the axis of the steering wheel and rotatably mounted thereon around an axis parallel with the axis of the steering wheel, two pinions rigid with said spindle, a stationary first toothed wheel rigid with said stationary tubular support and meshing with one of said pinions, a second toothed wheel rigid with said watch coaxially with the latter and with the axis of the steering wheel and which is driven by the other of said pinions, the gearing ratio between said first wheel and its pinion being the same as between said second wheel and its pinion, so as to constrain said watch to remain stationary when the steering wheel is being angularly shifted, a further pinion carried by said eccentric spindle, and a wheel forming part of said winding-up gearing and with which meshes said further pinion, whereby the watch is wound up through the successive shiftings of the steering wheel.

6. In a watch-carrying steering wheel for vehicles, wherein the watch comprises a winding-up spindle and wherein the steering wheel is mounted at the extremity of a steering column rotating in a stationary tubular support, a watch coaxial with the axis of said steering wheel and mounted thereon, a spindle eccentric with reference to the axis of the steering wheel and rotatably mounted thereon around an axis parallel with the axis of the steering wheel, two pinions rigid with said spindle, a stationary first toothed wheel rigid with said stationary tubular support and meshing with one of said pinions, a second toothed wheel rigid with said watch coaxially with the latter and with the axis of the steering wheel and which is driven by the other of said pinions, the gearing ratio between said first wheel and its pinion being the same as between said second wheel and its pinion, so as to constrain said watch to remain stationary when the steering wheel is being angularly shifted, and connecting means operatively connecting said steering wheel to said winding-up spindle, whereby the watch is wound up through the successive shiftings of the steering wheel.

7. In a steering wheel as claimed in claim 6, carrying a watch which is provided with a casing comprising a bottom, and with a winding-up gearing; a spindle connected with said gearing, coaxial with the watch and passing through said bottom, a disc provided with a radial notch, secured to said spindle, and a projection rigid with the steering column engaging in said notch in such a way that said spindle revolves in unison with the steering column, whereby the successive angular movements of the steering wheel provide for the automatic winding-up of the watch.

8. In a steering wheel as claimed in claim 6, carrying a watch which is provided with a casing comprising a bottom, and with a winding-up gearing; a spindle connected with said gearing, coaxial with the watch, and passing through said bottom, a bent projection carried by said spindle, a nut provided with a notch securing the steering wheel to the steering column, said bent projection engaging said notch in such a way that said spindle revolves in unison with the steering column, whereby the successive angular movements of the steering wheel provide for the automatic winding-up of the watch.

9. In a steering wheel as claimed in claim 6, carrying a watch provided with a casing comprising a bottom, and with a winding-up gearing; an extension of the steering column, of lesser cross-section, passing through said bottom and on which the watch is rotatably carried, a square shaped portion at the extremity of said extension, and a wheel forming part of the winding-up gearing mounted on said square shaped portion, whereby the successive angular movements of the steering wheel provide for the automatic winding-up of the watch.

References Cited in the file of this patent

UNITED STATES PATENTS

| Number | Name | Date |
|---|---|---|
| 1,946,890 | Whitehead et al. | Feb. 13, 1934 |
| 2,176,278 | Shaker | Oct. 17, 1939 |